US010356581B2

(12) United States Patent
Yang

(10) Patent No.: US 10,356,581 B2
(45) Date of Patent: Jul. 16, 2019

(54) LOGIN PROCESSING METHOD AND DEVICE OF MACHINE-TO-MACHINE/MAN COMMUNICATION TERMINAL EQUIPMENT

(71) Applicant: ZTE CORPORATION, Shenzhen, Guangdong Province (CN)

(72) Inventor: Kun Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 15/320,264

(22) PCT Filed: Aug. 14, 2014

(86) PCT No.: PCT/CN2014/084433
§ 371 (c)(1),
(2) Date: Dec. 19, 2016

(87) PCT Pub. No.: WO2015/192455
PCT Pub. Date: Dec. 23, 2015

(65) Prior Publication Data
US 2017/0149754 A1 May 25, 2017

(30) Foreign Application Priority Data
Jun. 20, 2014 (CN) .......................... 2014 1 0283617

(51) Int. Cl.
*G06F 21/00* (2013.01)
*H04W 12/06* (2009.01)
(Continued)

(52) U.S. Cl.
CPC ........... *H04W 4/70* (2018.02); *H04L 41/0866* (2013.01); *H04L 63/08* (2013.01);
(Continued)

(58) Field of Classification Search
None
See application file for complete search history.

(56) References Cited

U.S. PATENT DOCUMENTS

2012/0290872 A1* 11/2012 He ........................ H04W 4/70
714/4.11

FOREIGN PATENT DOCUMENTS

CN 102026215 A 4/2011
CN 102045870 A * 5/2011
(Continued)

OTHER PUBLICATIONS

International Search Report and Written Opinion dated Mar. 24, 2015 for PCT Application No. PCT/CN2014/084433.
(Continued)

*Primary Examiner* — Alexander Lagor
(74) *Attorney, Agent, or Firm* — Plumsea Law Group, LLC

(57) ABSTRACT

The present document provides a method and apparatus for login processing of a Machine-to-Machine/Man (M2M) terminal device, herein, the method includes: transmitting a login request to an M2M platform; receiving an operation corresponding to a detection result obtained after the M2M platform detects a parameter configuration status of an M2M terminal device; and executing the operation corresponding to the detection result. The present document solves the problem of low login processing efficiency of an M2M terminal device in the related art, and then realizes processing the parameter configuration status of the M2M terminal during the login processing of the M2M terminal device.

13 Claims, 8 Drawing Sheets

(51) Int. Cl.
*H04W 4/70* (2018.01)
*H04L 12/24* (2006.01)
*H04L 29/06* (2006.01)
*H04L 29/08* (2006.01)

(52) U.S. Cl.
CPC .......... *H04L 63/0823* (2013.01); *H04L 63/10* (2013.01); *H04L 67/12* (2013.01); *H04W 12/06* (2013.01); *H04L 67/34* (2013.01)

(56) References Cited

FOREIGN PATENT DOCUMENTS

| | | |
|---|---|---|
| CN | 102045870 A | 5/2011 |
| CN | 102567611 A | 7/2012 |
| CN | 103370887 A | 10/2013 |

OTHER PUBLICATIONS

Extended European Search Report dated May 22, 2017 for European Patent Application No. 14894954.8.

\* cited by examiner

LOGIN PROCESSING METHOD AND DEVICE OF MACHINE-TO-MACHINE/MAN COMMUNICATION TERMINAL EQUIPMENT

CROSS-REFERENCE TO RELATED APPLICATION(S)

This application is the U.S. National Phase application of PCT application number PCT/CN2014/084433 having a PCT filing date of Aug. 14, 2014, which claims priority of Chinese patent application 201410283617.9 filed on Jun. 20, 2014, the disclosures of which are hereby incorporated by reference.

TECHNICAL FIELD

The present document relates to the field of communication, and in particular to a method and apparatus for login processing of a Machine-to-Machine/Man (M2M) terminal device.

BACKGROUND OF THE RELATED ART

An M2M communication system can be divided into three layers in terms of logic function, i.e., a perceptual extension layer, a network/service layer and an application layer.

The perceptual extension layer is mainly for realizing acquisition, automatic identification and intelligent control of physical world information. Its main components include an M2M terminal device. The M2M terminal device is classified into two types, one is an M2M terminal having the communication capability with the M2M communication network, and the other is an M2M gateway having the communication capability with the M2M communication network and the M2M stub network.

The network/service layer supports the information transmission, routing and control of the perceptual layer, and provides support for the communication between people and things and between things and things in the Internet of Things. In combination with the classification of the Internet of Things, the network form at the network layer specifically includes: communication network, Internet, industry network, etc. Its main components include an M2M platform.

The application layer includes various specific applications of the Internet of Things, including both public services and industry services, and the industry services can be industry public services for the public and can also be industry dedicated services satisfying the special application requirements within the industry. Its main components include an M2M application server, referred to as M2M application for short.

In the relevant technology, the login processing on the M2M terminal device by the M2M platform can only achieve simple certification and authentication operations and judge whether to allow the terminal device to login, and the login processing efficiency of the M2M terminal device is lower.

Therefore, in the relevant technology, there is a problem of low login processing efficiency of the M2M terminal device.

SUMMARY

The present document provides a method and apparatus for login processing of an M2M terminal device, in order to solve at least the problem existing in the related art that the login processing efficiency of the M2M terminal device is low.

According to one aspect of the present document, it provides a method for login processing of an M2M terminal device, including: transmitting a login request to an M2M platform; receiving an operation corresponding to a detection result obtained after the M2M platform detects a parameter configuration status of the M2M terminal device; and executing the operation corresponding to the detection result.

Alternatively, receiving the operation corresponding to the detection result obtained after the M2M platform detects the parameter configuration status of the M2M terminal device includes at least one of the following: receiving a login request response sent by the M2M platform, herein, the login request response carries the operation corresponding to the detection result obtained after the M2M platform detects the parameter configuration status of the M2M terminal device; and after receiving the login request response sent by the M2M platform, receiving the operation corresponding to the detection result obtained after the M2M platform detects the parameter configuration status of the M2M terminal device.

Alternatively, before receiving the operation corresponding to the detection result obtained after the M2M platform detects the parameter configuration status of the M2M terminal device, the method further includes: receiving indication information carrying a waiting time sent by the M2M platform, herein, the indication information is used to indicate that the M2M terminal device can initiate a service request only after arrival of the waiting time.

Alternatively, after executing the operation corresponding to the detection result, the method further includes: transmitting an execution result after execution of the operation to the M2M platform.

According to another aspect of the present document, it provides a method for login processing of an M2M terminal device, including: receiving a login request transmitted by an M2M terminal device; obtaining a detection result through detecting a parameter configuration status of the M2M terminal device; and sending an operation corresponding to the detection result to the M2M terminal device.

Alternatively, before obtaining the detection result through detecting the parameter configuration status of the M2M terminal device, the method further includes: performing certification and authentication to the M2M terminal device, and in the case that the certification and authentication are passed, obtaining the detection result through detecting the parameter configuration status of the M2M terminal device.

Alternatively, sending the operation corresponding to the detection result to the M2M terminal device includes at least one of the following: sending a login request response to the M2M terminal device, herein, the login request response carries the operation corresponding to the detection result; and sending the operation corresponding to the detection result to the M2M terminal device after sending the login request response to the M2M terminal device.

Alternatively, the parameter configuration status of the M2M terminal device includes at least one of the following: an initialization scheme of the M2M terminal device is not sent successfully; parameter configuration of the M2M terminal device is not synchronized; the parameter configuration of the M2M terminal device has already been synchronized; a core parameter of the parameter configuration of the M2M terminal device is inconsistent; and the parameter configuration status of the M2M terminal device is others.

Alternatively, before sending the operation corresponding to the detection result to the M2M terminal device, the method further includes: transmitting indication information carrying a waiting time to the M2M terminal device, herein, the indication information is used to indicate that the M2M terminal device can initiate a service request only after arrival of the waiting time.

Alternatively, after sending the operation corresponding to the detection result to the M2M terminal device, the method further includes: receiving an execution result after execution of the operation that is transmitted by the M2M terminal device.

According to another aspect of the present document, it provides an apparatus for login processing of an M2M terminal device, including: a first transmission module, arranged to: transmit a login request to an M2M platform; a first receiving module, arranged to: receive an operation corresponding to a detection result obtained after the M2M platform detects a parameter configuration status of the M2M terminal device; and an execution module, arranged to: execute the operation corresponding to the detection result.

Alternatively, the first receiving module includes at least one of the following: a first receiving unit, arranged to: receive a login request response sent by the M2M platform, herein, the login request response carries the operation corresponding to the detection result obtained after the M2M platform detects the parameter configuration status of the M2M terminal device; and a second receiving unit, arranged to: after receiving the login request response sent by the M2M platform, receive the operation corresponding to the detection result obtained after the M2M platform detects the parameter configuration status of the M2M terminal device.

Alternatively, the apparatus further includes: a second receiving module, arranged to: receive indication information carrying a waiting time sent by the M2M platform, herein, the indication information is used to indicate that the M2M terminal device can initiate a service request only after arrival of the waiting time.

Alternatively, the apparatus further includes: a second transmission module, arranged to: transmit an execution result after execution of the operation to the M2M platform.

According to another aspect of the present document, it provides an M2M terminal device, including the apparatus according to any one of the above.

According to another aspect of the present document, it provides an apparatus for login processing of an M2M terminal device, including: a third receiving module, arranged to: receive a login request transmitted by an M2M terminal device; a detection module, arranged to: obtain a detection result through detecting a parameter configuration status of the M2M terminal device; and a sending module, arranged to: send an operation corresponding to the detection result to the M2M terminal device.

Alternatively, the apparatus further includes: a verification module, arranged to: perform certification and authentication to the M2M terminal device, and in the case that the certification and authentication are passed, obtain the detection result through detecting the parameter configuration status of the M2M terminal device.

Alternatively, the sending module includes at least one of the following: a first sending unit, arranged to: send a login request response to the M2M terminal device, herein, the login request response carries the operation corresponding to the detection result; and a second sending unit, arranged to: send the operation corresponding to the detection result to the M2M terminal device after sending the login request response to the M2M terminal device.

Alternatively, the apparatus further includes: a third transmission module, arranged to: transmit indication information carrying a waiting time to the M2M terminal device, herein, the indication information is used to indicate that the M2M terminal device can initiate a service request only after arrival of the waiting time.

Alternatively, the apparatus further includes: a fourth receiving module, arranged to: receive an execution result after execution of the operation transmitted by the M2M terminal device.

According to another aspect of the present document, it provides an M2M platform, including the apparatus according to any one of the above.

The present document, through sending a login request to an M2M platform; receiving an operation corresponding to a detection result obtained after the M2M platform detects a parameter configuration status of the M2M terminal device; and performing the operation corresponding to the detection result, solves the problem of low login processing efficiency of an M2M terminal device in the related art, and then realizes processing the parameter configuration status of the M2M terminal during the login processing of the M2M terminal device.

BRIEF DESCRIPTION OF THE DRAWINGS

The accompanying drawings described herein are used to provide further understanding for the present document and constitute a part of the present application. The illustrated embodiments of the present document and the description thereof are used to explain the present document, but do not constitute an inappropriate limitation to the present document. Herein.

SPECIFIC EMBODIMENTS

The present document is described in detail with reference to the accompanying drawings and in combination with embodiments hereinafter. It should be illustrated that, in the case of no conflicting, the embodiments in the present application and features in these embodiments can be combined with each other.

Figure 1:
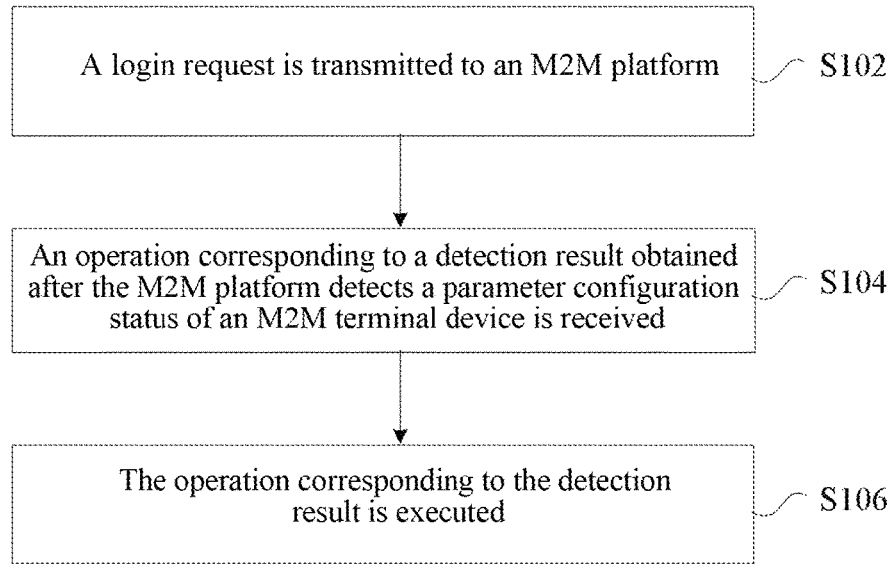
FIG. 1 is a flow chart of method one for login processing of an M2M terminal device according to an embodiment of the present document.

In the present embodiment, a method for login processing of an M2M terminal device is further provided, and it needs to be illustrated that the M2M terminal device mentioned hereinafter can be various types, for example, can be a traveling M2M terminal. FIG. 1 is a flow chart of method one for login processing of an M2M terminal device according to an embodiment of the present document, and as shown in FIG. 1, the flow includes the following steps:

in step S102, a login request is transmitted to an M2M platform;

in step S104, an operation corresponding to a detection result obtained after an M2M platform detects a parameter configuration status of the M2M terminal device is received; and in step S106, the operation corresponding to the detection result is executed.

Through the above steps, in terms of the M2M terminal device, by implementing processing on the parameter configuration status of the M2M terminal device when the login request is transmitted to the M2M platform, it solves the problem of low login processing efficiency of an M2M terminal device in the related art, and then achieves the effect of processing the parameter configuration status of the M2M terminal during the login processing of the M2M terminal device.

Correspondingly, a plurality of modes can also be used to receive the operation corresponding to the detection result obtained after the M2M platform detects the parameter configuration status of the M2M terminal device, for example, at least one of the following can be used: receiving a login request response sent by the M2M platform. Herein, the login request response carries the operation corresponding to the detection result obtained after the M2M platform detects the parameter configuration status of the M2M terminal device. After receiving the login request response sent by the M2M platform, receiving the operation corresponding to the detection result obtained after the M2M platform detects the parameter configuration status of the M2M terminal device.

Correspondingly, the M2M terminal device further receives indication information carrying a waiting time sent by the M2M platform. Herein, the indication information is used to indicate that the M2M terminal device can initiate a service request only after arrival of the waiting time.

In addition, after executing the operation corresponding to the detection result, an execution result after the operation is executed is further sent to the M2M platform.

Figure 2:
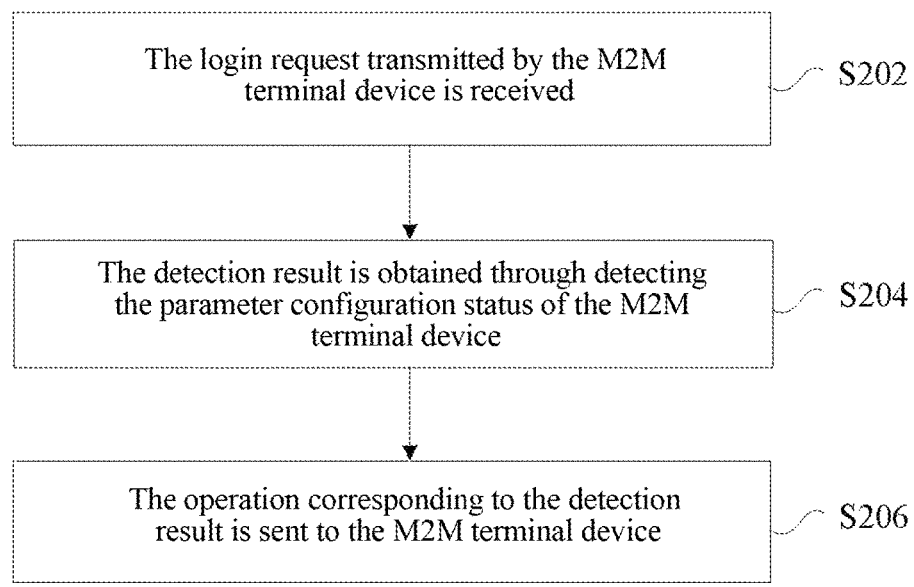
FIG. 2 is a flow chart of method two for login processing of an M2M terminal device according to an embodiment of the present document.

The present embodiment provides a method for login processing of an M2M terminal device; FIG. 2 is a flow chart of method two for login processing of an M2M terminal device according to an embodiment of the present document; and as shown in FIG. 2, the flow includes the following steps:

in step S202, a login request transmitted by an M2M terminal device is received;

in step S204, the detection result is obtained through detecting the parameter configuration status of the M2M terminal device, and it needs to be illustrated that the parameter configuration status of the above M2M terminal device can include various types, for example, can include at least one of the following: an initialization scheme of the M2M terminal device is not sent successfully; parameter configuration of the M2M terminal device is not synchronized; the parameter configuration of the M2M terminal device has already been synchronized; a core parameter of the parameter configuration of the M2M terminal device is inconsistent; and the parameter configuration status of the M2M terminal device is others;

in step S206, an operation corresponding to the detection result is sent to the M2M terminal device.

Through the above steps, for the M2M platform, by implementing detection on the parameter configuration status of the M2M terminal device when the login request of the M2M terminal device is received, it solves the problem of low login processing efficiency of an M2M terminal device in the related art, and then achieves the effect of processing the parameter configuration status of the M2M terminal during the login processing of the M2M terminal device.

In order to ensure the legitimacy of the M2M terminal device and the accuracy of the subsequent parameter configuration status, before the detection result is obtained by detecting the parameter configuration status of the M2M terminal device, certification and authentication can also be performed to the M2M terminal device, and in the case that the certification and authentication are passed, the detection result is obtained by detecting the parameter configuration status of the M2M terminal device.

Various processing modes can be adopted when the operation corresponding to the detection result is sent to the M2M terminal device, for example, the operation corresponding to the detection result can be sent when a login request response is sent to the M2M terminal device, that is, the login request response is sent to the M2M terminal device, herein, the login request response carries the operation corresponding to the detection result; for another example, the operation corresponding to the detection result can also be sent after the login request response is sent to the M2M terminal device, that is, the operation corresponding to the detection result is sent to the M2M terminal device after the login request response is sent to the M2M terminal device.

In order to ensure the effectiveness of the service request initiated by the M2M terminal device, before the operation corresponding to the detection result is sent to the M2M terminal device, indication information carrying a waiting time can further be transmitted to the M2M terminal device, herein, the indication information is used to indicate that the M2M terminal device can initiate a service request only after arrival of the waiting time; that is, only after the M2M terminal device executes the operation corresponding to the detection result sent by M2M platform, can the M2M terminal device proactively initiate the service request.

Alternatively, after the operation corresponding to the detection result is sent to the M2M terminal device, the execution result after execution of the operation sent by the M2M terminal device is further received. The M2M platform is rendered to update the parameter configuration status of the M2M terminal device.

The present embodiment further provides an apparatus for login processing of an M2M terminal device, and the apparatus is used to achieve the above embodiments and preferred implementation modes, which have been illustrated and will not be repeated. As used hereinafter, the term "module" is a combination of software and/or hardware that can achieve a predetermined function. Although the apparatus described in the following embodiments are alternatively realized by software, the realization of hardware or a combination of software and hardware is also possible and conceived.

Figure 3:
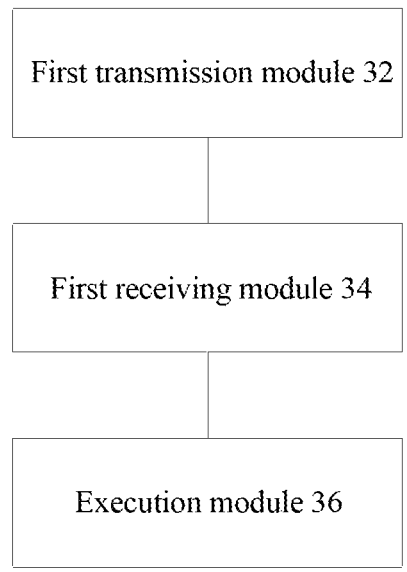
FIG. 3 is a block diagram of the structure of apparatus one for login processing of an M2M terminal device according to an embodiment of the present document.

FIG. 3 is a block diagram of the structure of apparatus one for login processing of an M2M terminal device according to an embodiment of the present document, and as shown in FIG. 3, the apparatus includes a first transmission module 32, a first receiving module 34, and an execution module 36, and is described hereinafter.

The first transmission module 32 is arranged to: transmit a login request to an M2M platform; the first receiving module 34 is connected to the above first transmission module 32 and arranged to: receive an operation corresponding to a detection result obtained after the M2M platform detects a parameter configuration status of the M2M terminal device; and the execution module 36 is connected to the first receiving module 34, and arranged to execute the operation corresponding to the detection result.

Figure 4:
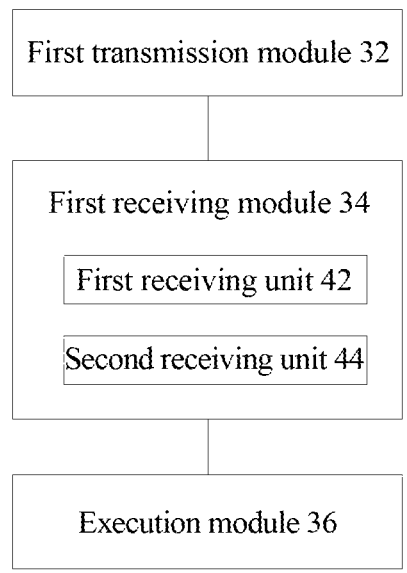
FIG. 4 is a block diagram of the preferred structure of a first receiving module 34 in apparatus one for login processing of an M2M terminal device according to an embodiment of the present document.

FIG. 4 is a block diagram of the preferred structure of a first receiving module 34 in apparatus one for login processing of an M2M terminal device according to an embodiment of the present document; as shown in FIG. 4, the first receiving module 34 includes at least one of the following: a first receiving unit 42 and a second receiving unit 44; and the third receiving module 84 is described hereinafter.

The receiving unit 42 is arranged to receive a login request response sent by the M2M platform, herein, the login request response carries the operation corresponding to the detection result obtained after the M2M platform detects the parameter configuration status of the M2M terminal device; the second receiving unit 44 is arranged to, after receiving the login request response sent by the M2M platform, receive the operation corresponding to the detection result obtained after the M2M platform detects the parameter configuration status of the M2M terminal device.

Figure 5:
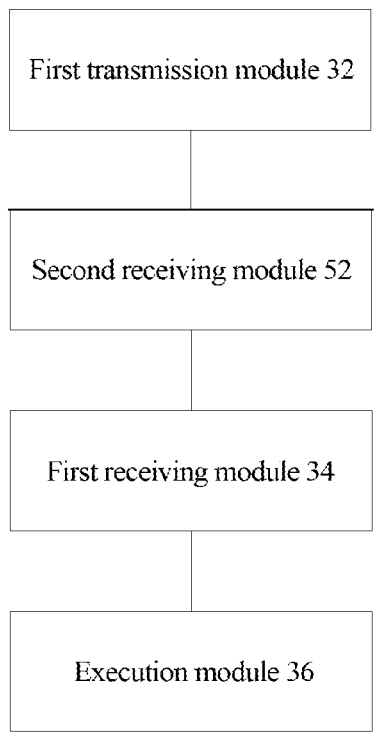
FIG. 5 is block diagram one of the preferred structure of apparatus one for login processing of an M2M terminal device according to an embodiment of the present document.

FIG. 5 is block diagram one of the preferred structure of apparatus one for login processing of an M2M terminal device according to an embodiment of the present document; as shown in FIG. 5, the apparatus, in addition to including all modules shown in FIG. 3, further includes: a second receiving module 52, and the second receiving module 52 is described hereinafter.

The second receiving module 52 is connected to the above first transmission module 32 and first receiving module 34, and is arranged to receive indication information carrying a waiting time sent by the M2M platform, herein, the indication information is used to indicate that the M2M terminal device can initiate a service request only after arrival of the waiting time.

Figure 6:
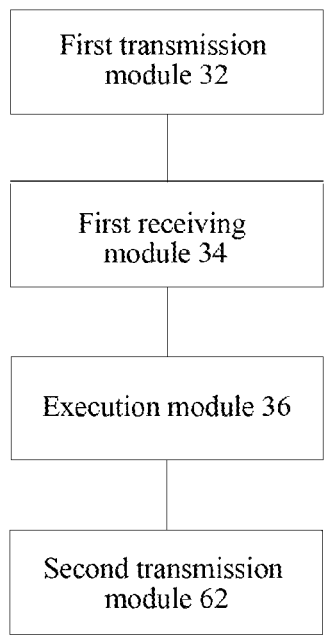
FIG. 6 is block diagram two of a preferred structure of apparatus one for login processing of an M2M terminal device according to an embodiment of the present document.

FIG. 6 is block diagram two of the preferred structure of apparatus one for login processing of an M2M terminal device according to an embodiment of the present document; as shown in FIG. 6, the apparatus, in addition to including all modules shown in FIG. 3, further includes: a second transmission module 62, and the second transmission module 62 is described hereinafter.

The second transmission module 62 is connected to the above execution module 36, and is arranged to transmit an execution result after execution of the operation to the M2M platform.

Figure 7:
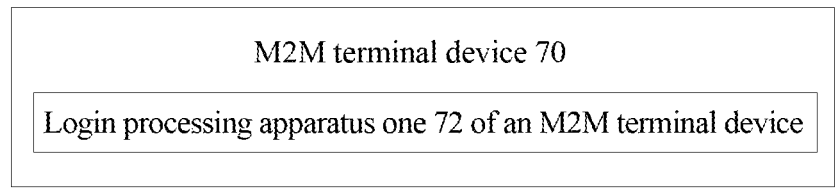
FIG. 7 is a block diagram of the structure of the M2M terminal device according to an embodiment of the present document.

FIG. 7 is a block diagram of the structure of an M2M terminal device according to an embodiment of the present document; as shown in FIG. 7, the M2M terminal device 70 includes apparatus one 72 for login processing of any of the above M2M terminal device.

Figure 8:
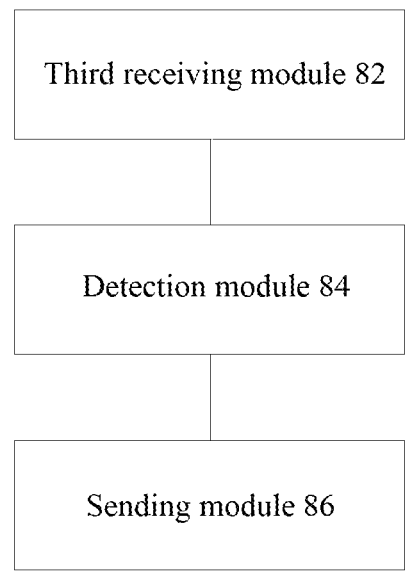
FIG. 8 is a block diagram of the structure of apparatus two for login processing of an M2M terminal device according to an embodiment of the present document.

FIG. 8 is a block diagram of the structure of apparatus two for login processing of an M2M terminal device according to an embodiment of the present document; as shown in FIG. 8, the apparatus includes a third receiving module 82, a detection module 84 and a sending module 86, and the apparatus is described hereinafter.

The third receiving module 82 is arranged to: receive a login request transmitted by an M2M terminal device; the detection module 84 is connected to the above third receiving module 82, and is arranged to obtain a detection result through detecting parameter configuration status of the M2M terminal device; and the sending module 86 is connected to the detection module 84, and is arranged to send an operation corresponding to the detection result to the M2M terminal device.

Figure 9:
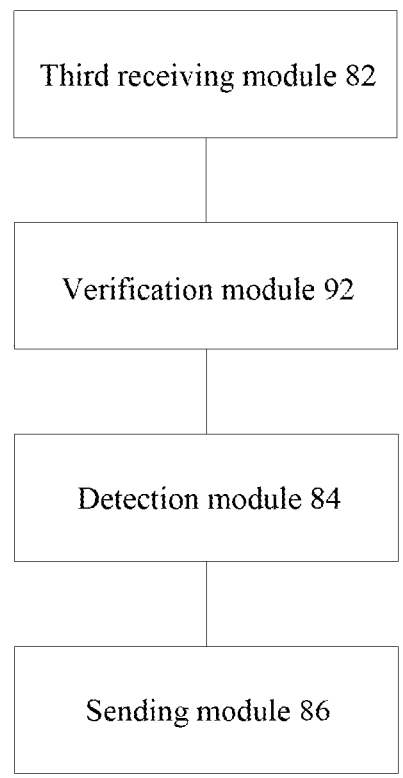
FIG. 9 is block diagram one of the preferred structure of apparatus two for login processing of an M2M terminal device according to an embodiment of the present document.

FIG. 9 is block diagram one of the preferred structure of apparatus two for login processing of an M2M terminal device according to an embodiment of the present document; as shown in FIG. 9, the apparatus, in addition to including all modules as shown in FIG. 8, further includes: a verification module 92, and the verification module 92 is described hereinafter.

The verification module is arranged to: perform certification and authentication to the M2M terminal device, and in the case that the certification and authentication are passed, obtain the detection result through detecting the parameter configuration status of the M2M terminal device.

Figure 10:
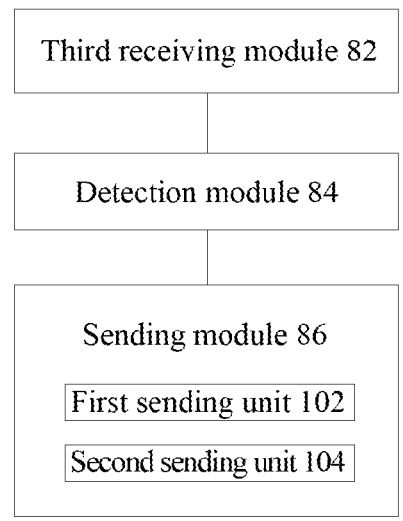
FIG. 10 is a block diagram of the preferred structure of a sending module 86 in apparatus two for login processing of an M2M terminal device according to an embodiment of the present document.

FIG. 10 is a block diagram of the preferred structure of a sending module 86 in apparatus two for login processing of an M2M terminal device according to an embodiment of the present document; as shown in FIG. 10, the sending module 86 includes at least one of the following: a first sending unit 102 and a second sending unit 104, and the sending module 86 is described hereinafter.

The first sending unit 102 is arranged to: send a login request response to the M2M terminal device, herein, the login request response carries the operation corresponding to the detection result; and the second sending unit 104 is arranged to send the operation corresponding to the detection result to the M2M terminal device after sending the login request response to the M2M terminal device.

Figure 11:
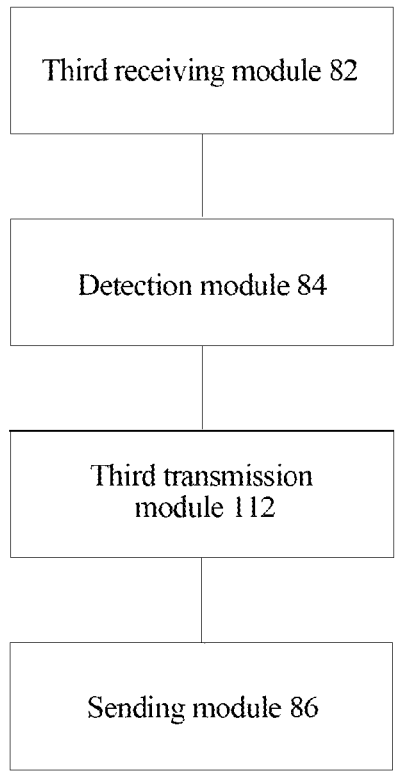
FIG. 11 is block diagram two of the preferred structure of apparatus two for login processing of an M2M terminal device according to an embodiment of the present document.

FIG. 11 is block diagram two of the preferred structure of apparatus two for login processing of an M2M terminal device according to an embodiment of the present document; as shown in FIG. 11, the apparatus, in addition to including all modules as shown in FIG. 8, further includes a third transmission module 112, and the third transmission module 112 is described hereinafter.

The third transmission module 112 is connected to the above detection module 84 and sending module 86, and is arranged to transmit indication information carrying a waiting time to the M2M terminal device, herein, the indication information is used to indicate that the M2M terminal device can initiate a service request only after arrival of the waiting time.

Figure 12:
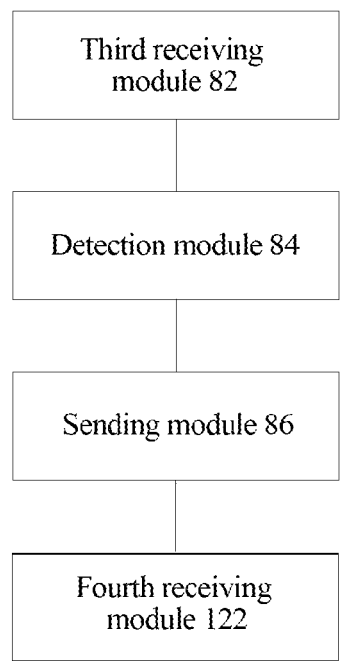
FIG. 12 is block diagram three of the preferred structure of apparatus two for login processing of an M2M terminal device according to an embodiment of the present document.

FIG. 12 is block diagram three of the preferred structure of apparatus two for login processing of an M2M terminal device according to an embodiment of the present document; as shown in FIG. 12, the apparatus, in addition to including all modules as shown in FIG. 8, further includes a fourth receiving module 122, and the fourth receiving module 122 is described hereinafter.

The fourth receiving module 122 is connected to the above sending module 86 and is arranged to receive an execution result after execution of the operation transmitted by the M2M terminal device.

Figure 13:
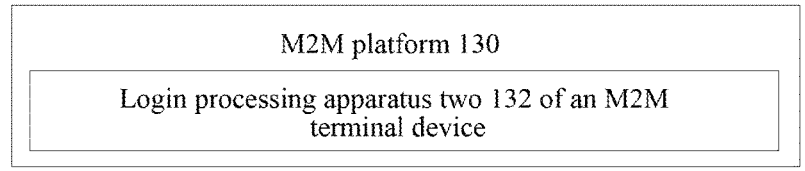
FIG. 13 is a block diagram of the structure of an M2M platform according to an embodiment of the present document.

FIG. 13 is a block diagram of the structure of an M2M platform according to an embodiment of the present document; as shown in FIG. 13, the M2M platform 130 includes apparatus two 132 for login processing of any of the above M2M terminal device.

In view of the problem of low login processing efficiency of the M2M terminal device existing in the related art, for example, further operation cannot be executed according to the parameter configuration status of the terminal device; and for example, whether it is required to send an initialization scheme, it is checked whether the parameter configuration status of the terminal is consistent with the platform, and whether it is required to inform the terminal device of performing software upgrade, etc. In the present embodiment, a method for login processing of an M2M terminal device is provided, in order to realize that the M2M platform is able to execute further processing according to the parameter configuration status of the terminal device when performing the certification and authentication to the M2M terminal device which requests to login, thus improving the management efficiency of the M2M platform to the M2M terminal device.

Figure 14:
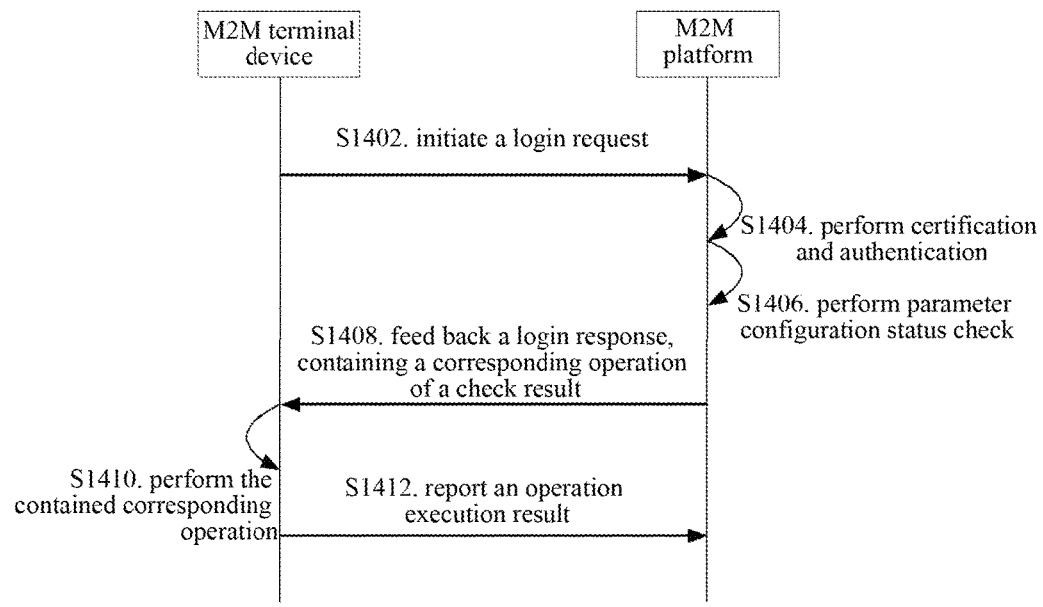
FIG. 14 is a flow chart of scheme one for login processing of an M2M terminal device according to an embodiment of the present document.

The method for login processing of the M2M terminal device can use the following two implementation schemes:

In scheme one, FIG. 14 is a flow chart of scheme one for login processing of an M2M terminal device according to an embodiment of the present document; as shown in FIG. 14, the procedure includes the following steps:

in step S1402, the M2M terminal device transmits a login request to the M2M platform, herein a parameter configuration status parameter is contained;

in step S1404, the M2M platform performs the certification and authentication to the M2M terminal device;

in step S1406, the M2M platform performs a parameter configuration status check to the M2M terminal device which passes the certification and authentication;

in step S1408, the M2M platform sends a login request response according to a check result of the parameter configuration status, herein, a corresponding operation of the check result is contained;

in step S1410, the M2M terminal device receives the login request response, and executes the corresponding operation;

in step S1412, the M2M terminal device reports an operation execution result to the M2M platform.

The scheme one is described using a specific implementation mode hereinafter.

First. The M2M terminal device transmits a login request to the M2M platform, the request message containing the following parameters:

1) a request type set as "terminal device login";
2) a terminal device identification set as IMSI or MSISDN of the terminal device;
3) a terminal device number;
4) a parameter configuration status;
5) a core configuration parameter CRC check code;
6) a software version of the terminal device (optional);

It needs to be illustrated that the "terminal device number" is composed of a terminal device provider identification, a terminal device model and a terminal device sequence number, and uniquely identifies one terminal device.

Second. The M2M platform receives the request message of the M2M terminal device, analyzes parameters in the request message, and performs the legitimacy verification and availability verification to the terminal device number in turn. If the verifications are not passed, then the M2M terminal device fails to login, and the M2M platform returns a login failure reason as "the terminal device number is not legitimate" or "the terminal device number is not available", and records the detailed reason of the error; if the verifications are passed, then the following steps are continued.

Third. The M2M platform checks the registration status of the terminal device number; if it is "not registered", then the M2M terminal device fails to login, and the M2M platform returns the login failure reason as "the terminal is in an 'unregistered state'", and records the detailed reason of the error; if it is "registered", then the following steps are continued.

Fourth. The M2M platform checks whether a binding relationship between the terminal device number and the terminal device identification is consistent with the binding relationship recorded in the platform. If inconsistent, the M2M terminal device fails to login, and the M2M platform returns the login failure reason as "the binding relationship of the terminal device is inconsistent with the one recorded in the platform", and the login interaction process is ended since then; if consistent, then the following steps are continued.

Fifth. The M2M platform performs the legitimacy and availability verifications to the terminal device and the availability verification of the M2M application. If the verifications are not passed, then the M2M terminal device fails to login, the M2M platform returns the login failure reason as "the terminal device identification is not legitimate" or "the terminal device identification is not available" or "the application is not available", and records the detailed reason of the error; if the verifications are passed, then this login verification procedure is ended since then, and the following steps are continued.

Sixth. The M2M platform checks the parameter configuration status of the M2M terminal device:

6.1. if the "parameter configuration status" parameter is "the initialization scheme is not successfully sent", then it is forwarded to step 8;

6.2. if the "parameter configuration status" parameter is "the configuration is not synchronized", then it is forwarded to step 8;

6.3. if the "parameter configuration status" parameter is "the configuration has already been synchronized", then the M2M platform checks the "core configuration parameter CRC check code" parameter, and execute a core parameter verification process. If the core configuration parameter CRC verification code reported by the terminal device is inconsistent with the check code calculated by the platform, then it is forwarded to step 8; if the check code is consistent, then it is forwarded to step 7;

6.4. if the "the parameter configuration status" parameter is an other status, then it is forwarded to step 7.

Seventh. The M2M platform updates the status of the M2M terminal device as "already logged in", and transmits the login request response to the M2M terminal device, and the login process is completed. The response message includes the following parameters:

1) a request type set as "terminal device login response";
2) a terminal device number Eighth. The M2M platform updates the status of the M2M terminal device as "logged in", and transmits the login request response to the M2M terminal device, and the following steps are continued. The response message includes the following parameters:

1) a request type set as "terminal device login response";
2) a terminal device number At the same time, the response message contains the corresponding operation of the check result of the parameter configuration status of the M2M terminal device:

1) if "the parameter configuration status" is "the initialization scheme is not successfully sent", then the response message sent by the M2M platform contains the initialization scheme;
2) if "the parameter configuration status" is "the configuration is not synchronized", then the response message sent by the M2M platform contains the configuration parameter;
3) if "the core configuration parameter CRC check code" is verified to be inconsistent, then the response message sent by the M2M platform contains a core configuration parameter information request.

Ninth. The M2M terminal device receives the response message sent by the M2M platform, and executes the operations contained therein:

1) if the initialization scheme is contained in the response message, then the M2M terminal device updates local configuration information according to the initialization scheme, and sets the "parameter configuration status" as "the initialization scheme is successfully sent", and transmits an initialization scheme sending success response to the M2M platform;
2) if the response message contains the configuration parameter, then the M2M terminal device updates the local configuration information according to the configuration parameter, and sets "the parameter configuration status" as "the configuration has already been synchronized", and transmits a configuration scheme sending success response to the M2M platform;
3) if the response message contains a core configuration parameter information request, then the M2M terminal device reports the core configuration parameter information to the M2M platform.

Figure 15:
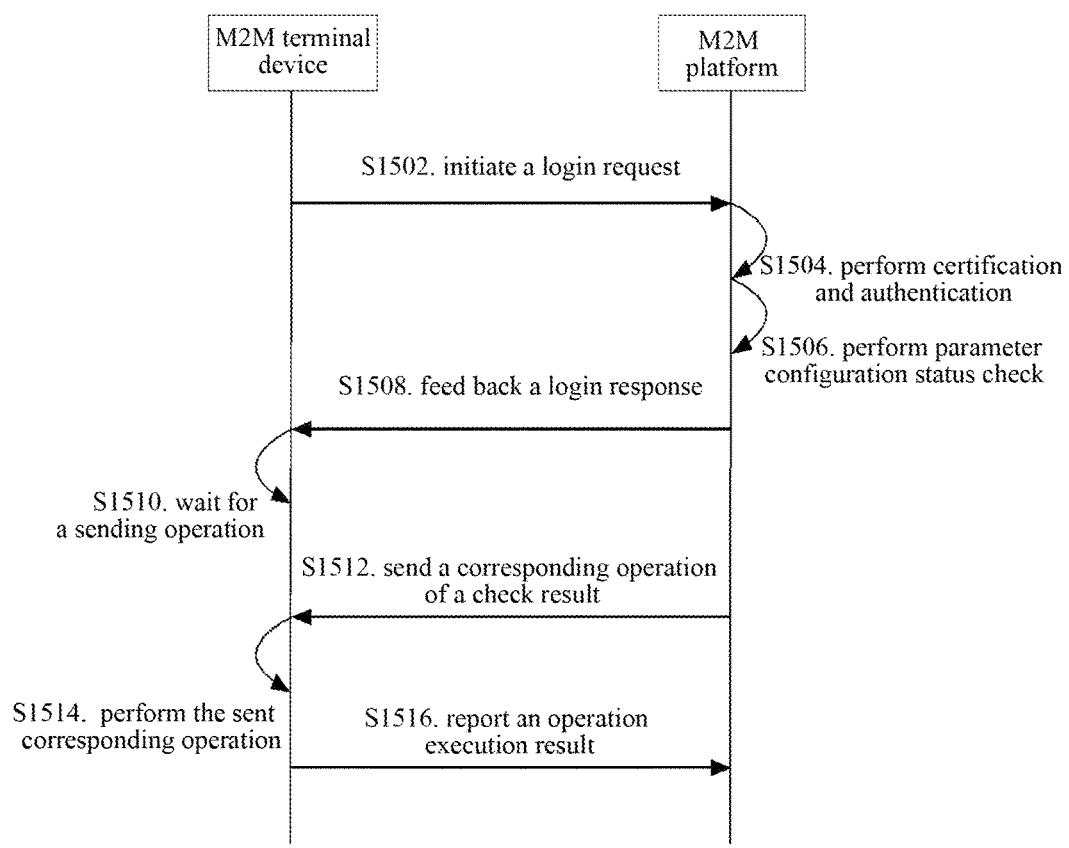
FIG. 15 is a flow chart of scheme two for login processing of an M2M terminal device according to an embodiment of the present document.

In scheme two, FIG. 15 is a flow chart of scheme two for login processing of an M2M terminal device according to an embodiment of the present document, and as shown in FIG. 15, the procedure includes the following steps:

in step S1502, the M2M terminal device transmits a login request to the M2M platform, herein a parameter configuration status parameter is contained;

in step S1504, the M2M platform performs certification and authentication to the M2M terminal device;

in step S1506, the M2M platform performs a parameter configuration status check to the M2M terminal device which passes the certification and authentication, and feeds back a login request response;

in step S1508, the M2M terminal device receives a login request response;

in step S1510, the M2M terminal device waits for an sending operation;

in step S1512, the M2M platform sends the corresponding operation according to the parameter configuration status check result of the M2M terminal device;

in step S1514, the M2M terminal device executes the corresponding operation;

in step S1516, the M2M terminal device feeds back the execution result to the M2M platform.

The scheme two is described using a specific implementation mode hereinafter.

Step 1 to step 6 of embodiment two are same as the step 1 to step 6 of embodiment one correspondingly.

7. The M2M platform updates the status of the M2M terminal device as "already logged in", and transmits the login request response to the M2M terminal device, and the login process is completed. The response message includes the following parameters:

1) a request type set as "terminal device login response";
2) a terminal device number;
3) a waiting time of the terminal device set as that the waiting time is equal to zero.

8. The M2M platform updates the status of the M2M terminal device as "already logged in", and transmits the login request response to the M2M terminal device, and the following steps are continued. The response message includes the following parameters:

1) a request type set as "terminal device login response";
2) a terminal device number;
3) a waiting time of the terminal device set as that the waiting time is greater than zero (for indicating that the M2M terminal device can initiate the service request only after waiting for a period of time, so that the M2M platform sends a corresponding operation according to a parameter configuration status check result of the M2M terminal device).

9. The M2M platform sends the corresponding operation according to the parameter configuration status check result of the M2M terminal device:

1) if "the parameter configuration status" is "the initialization scheme is not successfully sent", then the M2M platform sends the initialization scheme;
2) if "the parameter configuration status" is "the configuration is not synchronized", then the M2M platform sends the configuration parameter;
3) if "the core configuration parameter CRC check code" is verified to be inconsistent, then the M2M platform sends a core configuration parameter information request.

10. The M2M terminal device performs the operations sent by the M2M platform:

1) if the M2M platform sends the initialization scheme, then the M2M terminal device updates local configuration information according to the initialization scheme, and sets the "parameter configuration status" as "the initialization scheme is successfully sent", and transmits an initialization scheme sending success response to the M2M platform;
2) if the M2M platform sends the configuration parameter, then the M2M terminal device updates the local configuration information according to the configuration parameter, and sets "the parameter configuration status" as "the configuration has already been synchronized", and transmits a configuration scheme sending success response to the M2M platform;

3) if the M2M platform sends a core configuration parameter information request, then the M2M terminal device reports the core configuration parameter information to the M2M platform.

Obviously, it can be understood by those skilled in the art that each module or each step above in the present document can be carried out by a universal computing device, and they can be integrated in a single computing device, or distributed in a network made of a plurality of computing devices. Alternatively, they can be carried out by executable program codes of the computing device, and accordingly, they can be stored in a storage device and implemented by the computing device, and in some situation, the shown or described steps can be executed according to a sequence different from the sequence therein, or they can be carried out by making them into various integrated circuit modules respectively, or making a plurality of modules or steps therein into a single integrated circuit module. In this way, the present document is not limited to any specific form of the combination of the hardware and software.

The above description is only the preferred embodiments of the present document and is not intended to limit the present document. For those skilled in the art, the present document can have various modifications and variations. All of modifications, equivalents and/or improvements without departing from the spirit and essence of the present document should be embodied in the scope of the present document.

INDUSTRIAL APPLICABILITY

As mentioned above, through the above embodiments and preferred implementation modes, it solves the problem of low login processing efficiency of an M2M terminal device in the related art, and then achieves the effect of processing the parameter configuration status of the M2M terminal during the login processing of the M2M terminal device.

What is claimed is:

1. A method for login processing of a Machine-to-Machine/Man, M2M, terminal device, comprising:
   transmitting a login request to an M2M platform;
   receiving an operation corresponding to a detection result obtained after the M2M platform detects a parameter configuration status of the M2M terminal device; and executing the operation corresponding to the detection result; wherein, receiving the operation corresponding to the detection result obtained after the M2M platform detects the parameter configuration status of the M2M terminal device comprises at least one of the following:
   receiving a login request response sent by the M2M platform, wherein, the login request response carries the operation corresponding to the detection result obtained after the M2M platform detects the parameter configuration status of the M2M terminal device; and
   after receiving the login request response sent by the M2M platform, receiving the operation corresponding to the detection result obtained after the M2M platform detects the parameter configuration status of the M2M terminal device;
   wherein, before receiving the operation corresponding to the detection result obtained after the M2M platform detects the parameter configuration status of the M2M terminal device, the method further comprises:
   receiving indication information carrying a waiting time sent by the M2M platform, wherein, the indication information is used to indicate that the M2M terminal device can initiate a service request only after arrival of the waiting time, wherein, only after the M2M terminal device executes the operation corresponding to the detection result sent by M2M platform, the M2M terminal device proactively initiates the service request.

2. The method according to claim 1, wherein, after executing the operation corresponding to the detection result, the method further comprises:
   transmitting an execution result after execution of the operation to the M2M platform.

3. A method for login processing of a Machine-to-Machine/Man, M2M, terminal device, comprising:
   receiving a login request transmitted by an M2M terminal device;
   obtaining a detection result through detecting a parameter configuration status of the M2M terminal device; and
   sending an operation corresponding to the detection result to the M2M terminal device; wherein, sending the operation corresponding to the detection result to the M2M terminal device comprises at least one of the following:
   sending a login request response to the M2M terminal device, wherein, the login request response carries the operation corresponding to the detection result; and
   sending the operation corresponding to the detection result to the M2M terminal device after sending the login request response to the M2M terminal device; wherein;
   before sending the operation corresponding to the detection result to the M2M terminal device, the method further comprises:
   transmitting indication information carrying a waiting time to the M2M terminal device, wherein, the indication information is used to indicate that the M2M terminal device can initiate a service request only after arrival of the waiting time; wherein, only after the M2M terminal device executes the operation corresponding to the detection result sent by M2M platform, the M2M terminal device proactively initiates the service request.

4. The method according to claim 3, wherein, before obtaining the detection result through detecting the parameter configuration status of the M2M terminal device, the method further comprises:
   performing certification and authentication on the M2M terminal device, and in the case that the certification and authentication are passed, obtaining the detection result through detecting the parameter configuration status of the M2M terminal device.

5. The method according to claim 3, wherein, the parameter configuration status of the M2M terminal device comprises at least one of the following:
   an initialization scheme of the M2M terminal device is not sent successfully; parameter configuration of the M2M terminal device is not synchronized; the parameter configuration of the M2M terminal device has already been synchronized; a core configuration parameter CRC check code of the M2M terminal device is inconsistent; and the parameter configuration status of the M2M terminal device is others.

6. The method according to claim 3, wherein, after sending the operation corresponding to the detection result to the M2M terminal device, the method further comprises:

receiving an execution result after execution of the operation transmitted by the M2M terminal device.

7. An apparatus for login processing of a Machine-to-Machine/Man, M2M, terminal device, comprising:
   a first transmitting module, arranged to: transmit a login request to an M2M platform;
   a first receiving module, arranged to: receive an operation corresponding to a detection result obtained after the M2M platform detects a parameter configuration status of the M2M terminal device; and
   an execution module, arranged to: execute the operation corresponding to the detection result;
   wherein; the first receiving module comprises at least one of the following:
   a first receiving unit, arranged to: receive a login request response sent by the M2M platform, wherein, the login request response carries the operation corresponding to the detection result obtained after the M2M platform detects the parameter configuration status of the M2M terminal device; and
   a second receiving unit, arranged to: after receiving the login request response sent by the M2M platform, receive the operation corresponding to the detection result obtained after the M2M platform detects the parameter configuration status of the M2M terminal device;
   wherein, the apparatus further comprises:
   a second receiving module, arranged to: receive indication information carrying a waiting time sent by the M2M platform, wherein, the indication information is used to indicate that the M2M terminal device can initiate a service request only after arrival of the waiting time; wherein, only after the M2M terminal device executes the operation corresponding to the detection result sent by M2M platform, the M2M terminal device proactively initiates the service request.

8. The apparatus according to claim 7, wherein, the apparatus further comprises:
   a second transmitting module, arranged to: transmit an execution result after execution of the operation to the M2M platform.

9. A Machine-to-Machine/Man, M2M, terminal device, comprising the apparatus according to claim 7.

10. An apparatus for login processing of a Machine-to-Machine/Man, M2M, terminal device, comprising:
    a third receiving module, arranged to: receive a login request transmitted by the M2M terminal device;
    a detecting module, arranged to: obtain a detection result through detecting a parameter configuration status of the M2M terminal device; and
    a sending module, arranged to: send an operation corresponding to the detection result to the M2M terminal device; wherein, the sending module comprises at least one of the following:
    a first sending unit, arranged to: send a login request response to the M2M terminal device, wherein, the login request response carries the operation corresponding to the detection result; and
    a second sending unit, arranged to: send the operation corresponding to the detection result to the M2M terminal device after sending the login request response to the M2M terminal device;
    wherein, the apparatus further comprises:
    a third transmitting module, arranged to: transmit indication information carrying a waiting time to the M2M terminal device, wherein the indication information is used to indicate that the M2M terminal device can initiate a service request only after arrival of the waiting time; wherein, only after the M2M terminal device executes the operation corresponding to the detection result sent by M2M platform, the M2M terminal device proactively initiates the service request.

11. The apparatus according to claim 10, wherein, the apparatus further comprises:
    a verification module, arranged to: perform certification and authentication on the M2M terminal device, and in the case that the certification and authentication are passed, obtain the detection result through detecting the parameter configuration status of the M2M terminal device.

12. The apparatus according to claim 10,
    wherein the apparatus further comprises:
    a fourth receiving module, arranged to: receive an execution result after execution of the operation transmitted by the M2M terminal device.

13. A Machine-to-Machine/Man, M2M, platform, comprising the apparatus according to claim 10.

* * * * *